US012730055B2

(12) United States Patent
Godefroy et al.

(10) Patent No.: US 12,730,055 B2
(45) Date of Patent: Sep. 8, 2026

(54) METHOD FOR PROCESSING AN IMAGE OF A SAMPLE COMPRISING BIOLOGICAL PARTICLES

(71) Applicant: COMMISSARIAT A L'ENERGIE ATOMIQUE ET AUX ENERGIES ALTERNATIVES, Paris (FR)

(72) Inventors: Guillaume Godefroy, Grenoble cedex (FR); Cédric Allier, Grenoble cedex (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 198 days.

(21) Appl. No.: 18/397,320

(22) Filed: Dec. 27, 2023

(65) Prior Publication Data

US 2024/0210302 A1 Jun. 27, 2024

(30) Foreign Application Priority Data

Dec. 27, 2022 (FR) ..................................... 22 14560

(51) Int. Cl.

*G01N 15/1433* (2024.01)
*G06V 20/69* (2022.01)
*G01N 15/1434* (2024.01)

(52) U.S. Cl.

CPC ....... *G01N 15/1433* (2024.01); *G06V 20/698* (2022.01); *G01N 2015/145* (2013.01); *G01N 2015/1454* (2013.01)

(58) Field of Classification Search

CPC ...... G06V 20/698; G06V 20/69; G06V 10/82; G06V 10/454; G06V 10/70;

(Continued)

(56) References Cited

U.S. PATENT DOCUMENTS

2018/0113064 A1* 4/2018 Allier ................. G01N 15/1433
2019/0101484 A1* 4/2019 Herve .................. G03H 1/0443
2019/0180147 A1* 6/2019 Zhang ................. G06F 18/2415

OTHER PUBLICATIONS

French Preliminary Search Report and Written Opinion issued Jun. 14, 2023 in French Application 22 14560 filed on Dec. 27, 2022, 10 pages (with English Translation of Categories of Cited Documents).

* cited by examiner

*Primary Examiner* — Sumati Lefkowitz
*Assistant Examiner* — Michael Adam Shariff
(74) *Attorney, Agent, or Firm* — Oblon, McClelland, Maier & Neustadt, L.L.P.

(57) ABSTRACT

Method for characterizing biological particles of a sample, the characterization aiming to determine a property of each particle, the method comprising:

a) measuring a characteristic of at least one particle of the sample;
b) processing the characteristic of the or each particle using an artificial intelligence algorithm;
c) based on the processing, characterizing the particles of the sample, so as to assign a class to each particle, each class being representative of the property of the particle;

the method being characterized in that the artificial intelligence algorithm has been trained beforehand by learning from labels, based on training samples, each training sample being assigned a proportion of cells in each class, such that the training is performed on the basis of the proportions respectively assigned to each training sample.

9 Claims, 6 Drawing Sheets

(58) Field of Classification Search

CPC . G06T 2207/30024; G06T 2207/30004; G06T 2207/20084; G06T 2207/20081; G06N 3/02; G06N 20/00; G06N 3/0464; G01N 2015/145

See application file for complete search history.

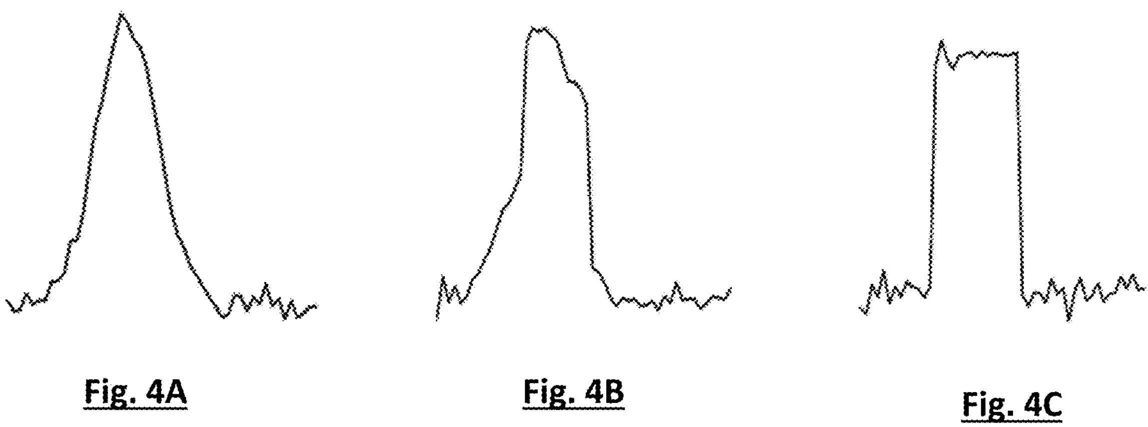
Fig. 4A
Fig. 4B
Fig. 4C
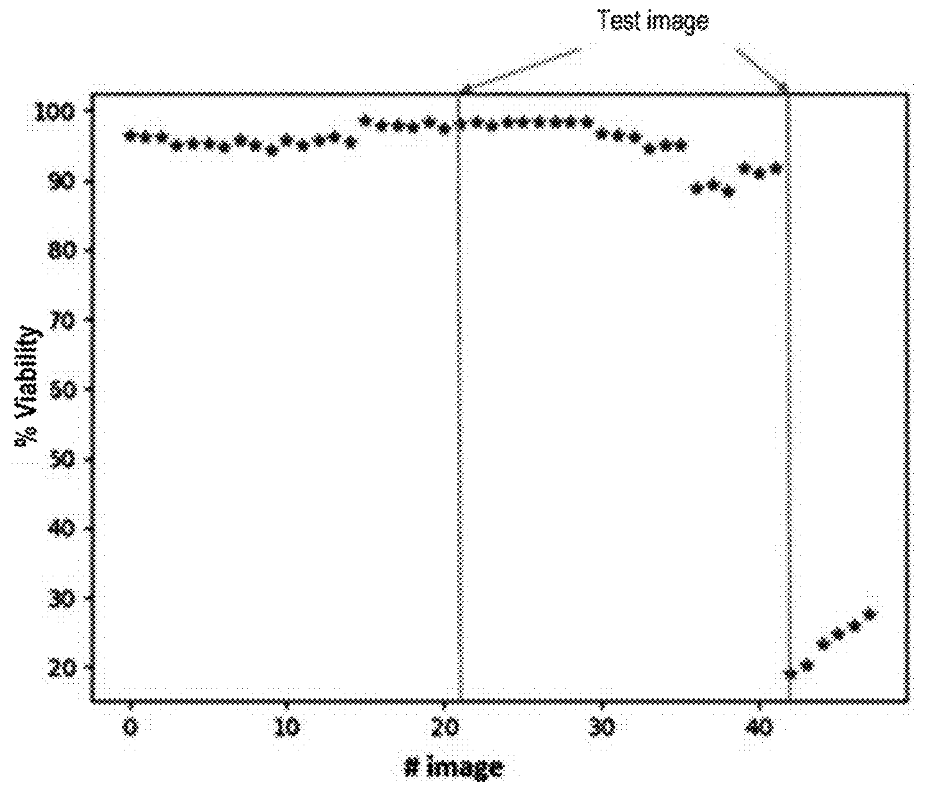
Fig. 5

METHOD FOR PROCESSING AN IMAGE OF A SAMPLE COMPRISING BIOLOGICAL PARTICLES

TECHNICAL FIELD

The technical field of the invention is the processing of a sample comprising biological particles.

PRIOR ART

Recent developments in the field of artificial intelligence are being applied in the field of microbiology. Neural networks have already been used to analyse images acquired by microscopes. WO2021/156192 describes the use of a supervised learning neural network to identify developing microorganisms. EP3995991 describes the use of a supervised learning neural network to identify cells dividing in a sample. In the two abovementioned documents, the neural network is fed by an image of a sample, acquired by a microscope.

One difficulty related to supervised learning is the need to obtain annotated training images, that is to say images in which the particles, whether cells or microorganisms, are annotated individually, on the basis of their respective properties. These training images are used to parameterize the neural network. Obtaining individual annotations is often a tedious operation, during which an operator has to work on a large number of images, and manually perform the individual annotations of each particle.

The invention disclosed below makes it possible to alleviate this constraint. It makes it possible to use a supervised learning artificial intelligence algorithm, making it easier to obtain annotations for training.

DISCLOSURE OF THE INVENTION

A first subject of the invention is a method for characterizing biological particles of a sample, the characterization assigning a class to each particle, each class being representative of a property of the particle, the method comprising:

a) determining a characteristic of at least one particle of the sample;

b) processing the characteristic of the or each particle using an artificial intelligence algorithm;

c) based on the processing, characterizing the particles of the sample, so as to assign a class to each particle;

wherein the artificial intelligence algorithm has been trained beforehand by learning from label proportions, with at least one training sample, comprising training particles, the training comprising:

(i) determining a characteristic of each training particle;

(ii) determining a proportion of training particles belonging to the same class;

(iii) annotating each training particle on the basis of the proportion determined in step (ii);

(iv) using the characteristics of the training particles, determined in (i), respectively annotated based on the annotations resulting from (iii), as training data for the artificial intelligence algorithm.

Preferably:

steps (i) to (iii) are carried out for various training samples;

each step (ii) comprises determining a proportion of training particles, belonging to the same class, respectively in each training sample;

the respective annotations of the training particles of one and the same training sample may be identical.

The property may be chosen from among:

a state of a particle, each class corresponding to a predetermined state of the particle;

a volume or of a dimension of a particle, each class corresponding to at least one value of the volume or of a dimension of each particle;

a morphological characteristic of each particle, each class corresponding to at least one morphological characteristic of each particle;

an optical property of each particle, each class corresponding to at least one value of said optical property;

a type of each particle, each class corresponding to a predetermined particle type.

The number of classes may be equal to 2. The number of classes may be greater than 2.

According to one possibility, the characteristic of each particle is an image of said particle;

in step i), each characteristic is an individual image of each particle of the or each training sample.

According to one possibility, step a) comprises acquiring an image of a set of particles of the sample;

in step b), the image acquired in step a) is used as input datum for the artificial intelligence algorithm.

According to one embodiment, step a) comprises illuminating the sample with a light wave and acquiring an image of the sample using a defocused or lensless imaging technique, the acquired image comprising diffraction patterns of particles of the sample;

applying a holographic reconstruction algorithm to the acquired image of the sample, so as to obtain a phase image of each particle, the phase image being representative of a phase shift, caused by each particle, of the light wave illuminating the sample;

the phase image of each particle forms the characteristic of each particle;

in step b), the phase image obtained in step a) is used as input datum for the artificial intelligence algorithm.

In step (i), the characteristic of each particle may be a phase image of each particle;

According to one embodiment, step a) comprises illuminating the sample with a light wave and acquiring an image of the sample using a defocused or lensless imaging technique, the image comprising diffraction patterns of particles of the sample;

applying a holographic reconstruction algorithm to the acquired image of the sample, so as to obtain, for at least one particle, a profile of an optical property of the light wave illuminating the sample at various distances from the sample;

the profile of the or each particle forms the characteristic of said particle;

in step b), the or each profile obtained in step a) is used as input datum for the artificial intelligence algorithm.

Each particle may be a cell or a microorganism.

Another subject of the invention is a device for characterizing biological particles of a sample, the characterization being intended to assign a class to each particle, each class being representative of a property of the particle, the device comprising:

a light source, configured to illuminate the sample;

an image sensor, configured to acquire an image of the sample;

a processing unit, programmed to implement steps b) and c) of a method according to the first subject of the invention, the artificial intelligence algorithm implemented by the processing unit having been trained beforehand by learning from labels, based on training samples, comprising training particles, the training implementing steps (i) to (iv) of a method according to the first subject of the invention.

The invention will be better understood on reading the disclosure of the exemplary embodiments presented, in the remainder of the description, with reference to the figures listed below.

FIGURES

FIG. 1A schematically shows one example of a device according to the invention.

FIG. 1B schematically shows another example of a device according to the invention.

FIGS. 4A, 4B and 4C show profiles belonging to three different classes, respectively.

FIG. 5 shows the proportion of living cells (y-axis) for various cells (x-axis).

Figure 6:
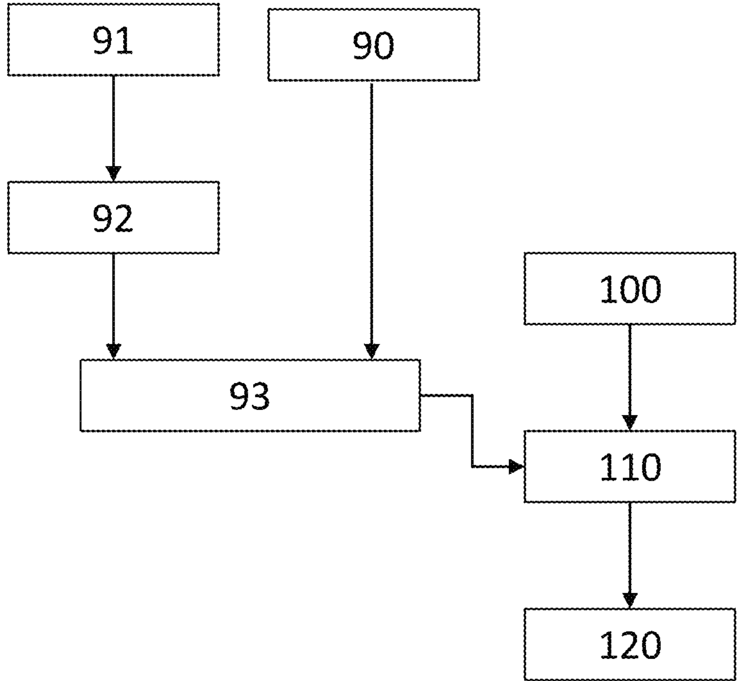

FIG. 6 schematically shows the main steps of a method according to the invention.

DISCLOSURE OF PARTICULAR EMBODIMENTS

Figure 1A:
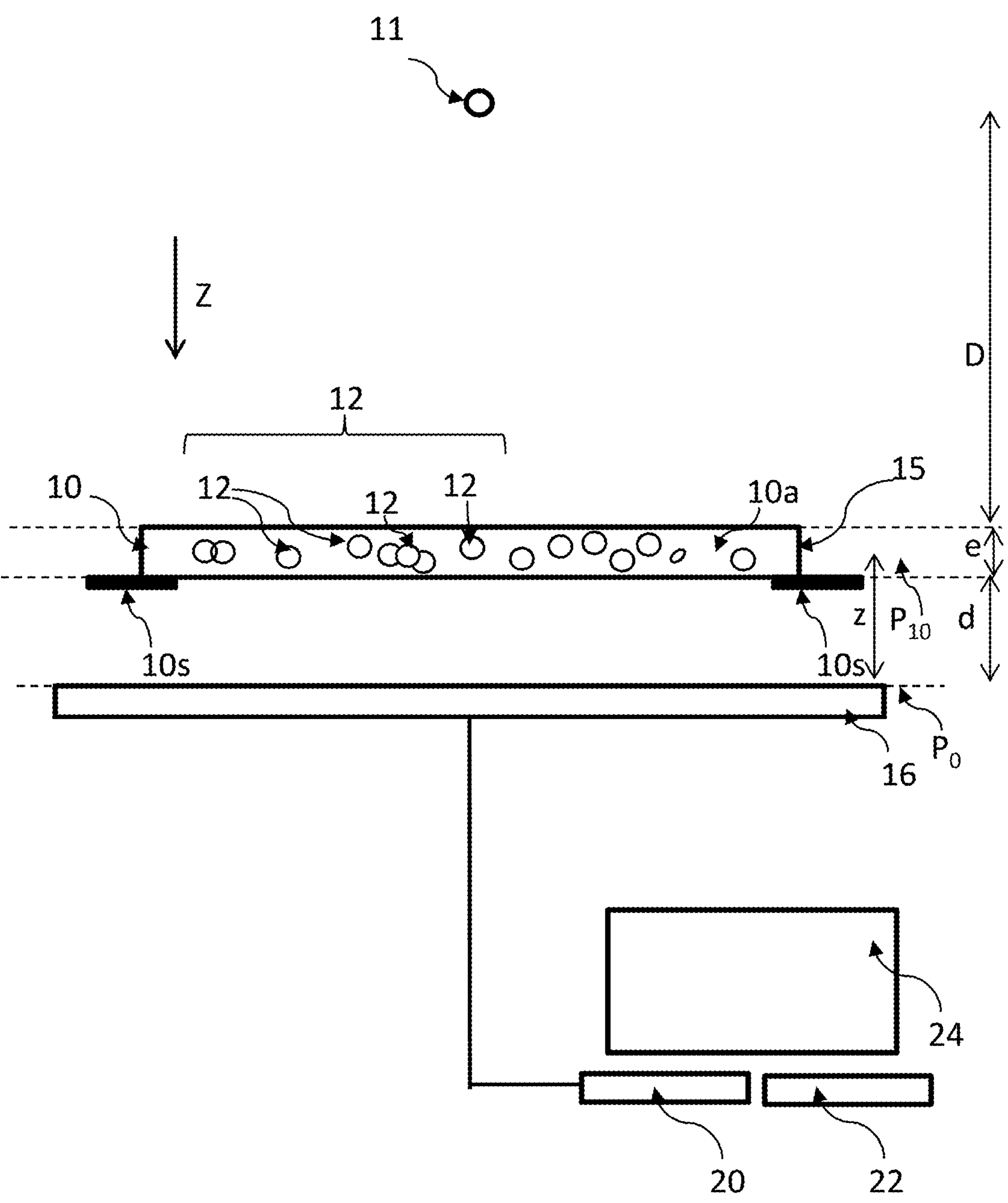

FIG. 1A shows one example of a device according to the invention. A light source 11 is configured to emit a light wave propagating towards a sample 10 along an axis of propagation Z. The light wave is emitted in a spectral band AA.

The sample 10 is a sample comprising biological particles 12, in particular cells or microorganisms, which it is desired to characterize. These may also be spores, or microbeads, usually implemented in biological applications, or even microalgae. In the example described, the particles 12 are CHO cells (hamster ovarian cells) bathed in a liquid saline buffer 10*a*. Preferably, the particles 12 have a diameter, or are inscribed within a diameter, less than 100 μm, and preferably less than 50 μm or 20 μm. Preferably, the particles have a diameter, or are inscribed within a diameter, greater than 500 nm or 1 μm.

In the example shown in FIG. 1A, the sample comprises a medium 10*a* in which the particles 12 are bathed. The particles 12 in this example are cells whose state it is desired to determine: living state or dead state. The medium 10*a* in which the particles are bathed may in particular be a liquid, for example a culture medium.

In this example, the sample 10 is contained in a fluid chamber 15. The fluid chamber 15 is, for example, a Countess® fluid chamber with a thickness e=100 μm. The thickness e of the sample 10, along the axis of propagation Z, typically varies between 10 μm and 1 cm, and is preferably between 20 μm and 500 μm. The sample 10 extends along a plane, referred to as plane of the sample, preferably perpendicular to the axis of propagation Z. It is held on a support 10*s* at a distance d from an image sensor 16.

The distance D between the light source 11 and the sample 10 is preferably greater than 1 cm. It is preferably between 2 and 30 cm. Advantageously, the light source, seen by the sample, is considered to be a point light source. This means that its diameter (or its diagonal) is preferably less than one tenth, better still one hundredth of the distance between the sample and the light source. The light source 11 may be a light-emitting diode, as shown in FIG. 1A. It may be associated with a diaphragm or spatial filter or an optical fibre. The light source 11 may be a laser source, such as a laser diode.

Preferably, the emission spectral band AA of the light wave emitted by the source has a width less than 100 nm. The term "spectral bandwidth" is understood to mean a full width at half maximum of said spectral band.

The sample 10 is arranged between the light source 11 and the image sensor 16 mentioned above. The latter preferably extends parallel, or substantially parallel, to the sample. The term "substantially parallel" means that the two elements do not need to be strictly parallel, with an angular tolerance of a few degrees, less than 20° or 10°, being allowed. The image sensor 16 is able to form an image I along a detection plane $P_0$. In the example shown, this is an image sensor comprising a matrix of pixels, of CCD or CMOS type. The detection plane $P_0$ preferably extends perpendicular to the axis of propagation Z of the incident light wave.

The configuration shown in FIG. 1A is a lensless imaging configuration, in which there is no image-forming optical unit between the sample and the image sensor. This does not rule out the possible presence of focusing microlenses in each pixel of the image sensor 16, these not having a function of magnifying the image acquired by the image sensor.

The distance d between the sample 10 and the matrix of pixels of the image sensor 16 is advantageously between 50 μm and 2 cm, preferably between 100 μm and 2 mm.

The device comprises a processing unit 20, programmed to implement the operations described below. The instructions followed by the processing unit are stored in a memory 22 connected to the processing unit by a wired or wireless link. The processing unit 20 may for example comprise a microprocessor. The processing unit may be connected to a screen 24.

Figure 1B:
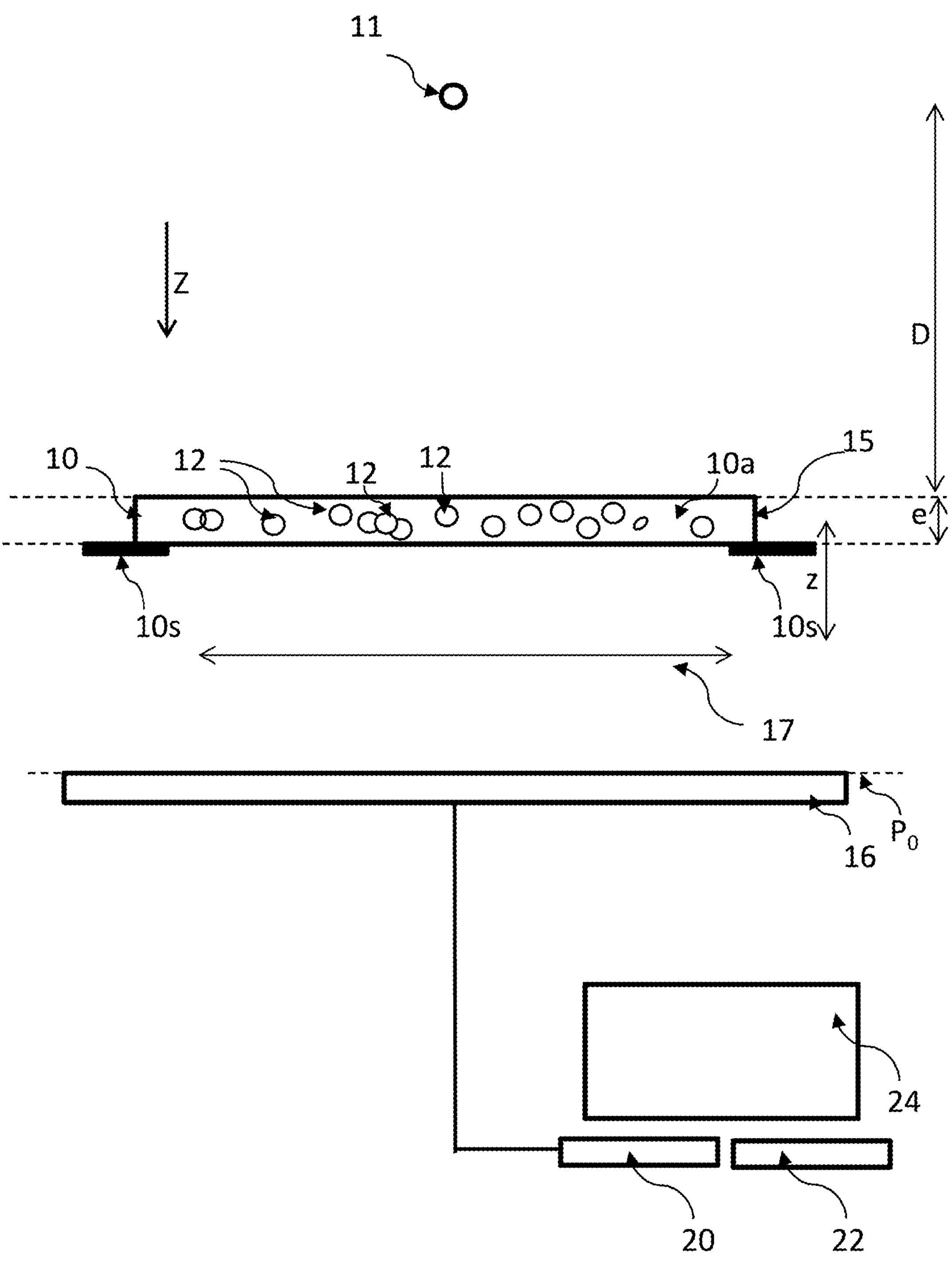

FIG. 1B shows another configuration, in which the device comprises an optical system 17, such as a lens 17 or a group of lenses. The optical system may be configured to form a focused image of the sample on the detection plane of the image sensor. As an alternative, the optical system may be configured to form a defocused image of the sample. The optical system comprises an object plane and an image plane. A defocused image is obtained when the object plane and/or the image plane are slightly offset with respect to the sample or to the detection plane, respectively. The term "slightly offset" is understood to mean by an offset distance of a few tens of μm.

The processing unit 20 implements a learning from label proportions-based artificial intelligence algorithm, based on each image acquired by the image sensor. The algorithm is a neural network formed of twenty convolution layers, followed by a multilayer perceptron. The purpose of the algorithm is to assign a class to the cells, on the basis of a property of the cells. In this example, two classes are considered: living cell or dead cell.

More generally, the classification performed by the algorithm aims to characterize the cells present in the sample. The term "characterization" is understood to mean determining a property of a particle. The property may be:

- a nature of a particle, that is to say a classification of this particle from among one or more predetermined classes; this may for example involve identifying various types of particles.
- a state of a particle, from among one or more predetermined states, for example a living state or a dead state;
- a size of a particle, or its shape, or its volume or any other geometric or morphological parameter: in this case, the property may in particular be the fact that the particle belongs to a size range (for example diameter between x and y), or to a volume range, or to a range of any other geometric or morphological parameter;
- an optical property of one or more particles, for example the refractive index or an optical transmission property: in this case, the property may in particular be the fact that the particle belongs to a range of values of said property (for example refractive index between x and y);
- a count of said particles on the basis of their characterization, for example a count of particles of the same class.

The algorithm aims to determine, for each particle, a probability of it belonging to a class. Each class is representative of the value of the property (for example dead or living, or identification of the particle), or of a range of values of the property (for example a range of dimensions, or a range of refractive index values).

The artificial intelligence algorithm has been trained beforehand by learning from labels, based on training samples. A proportion of cells in each class has been assigned beforehand to each training sample, such that the training is performed on the basis of the proportions respectively assigned to each training sample.

Figure 2A:
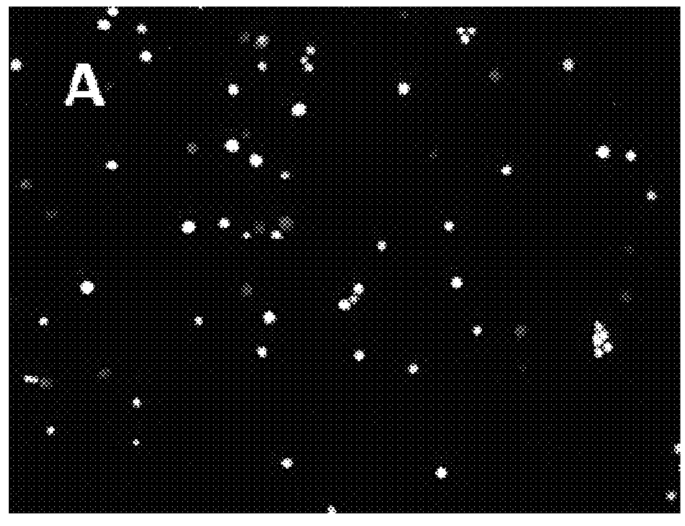
FIGS. 2A, 2B and 2C show images of various samples comprising living cells and dead cells.
Figure 2B:
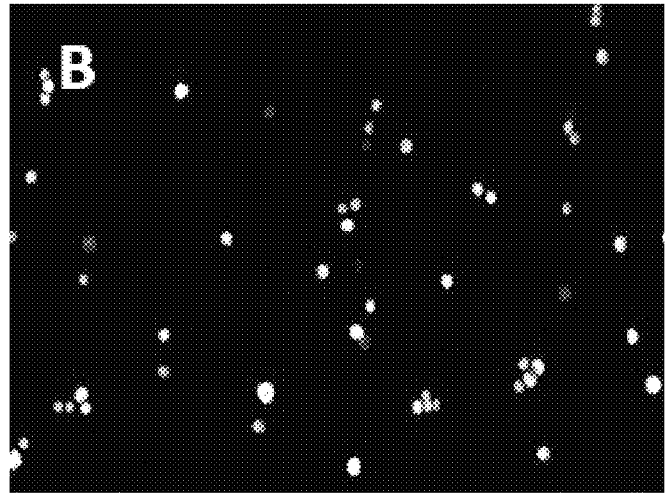
Figure 2C:
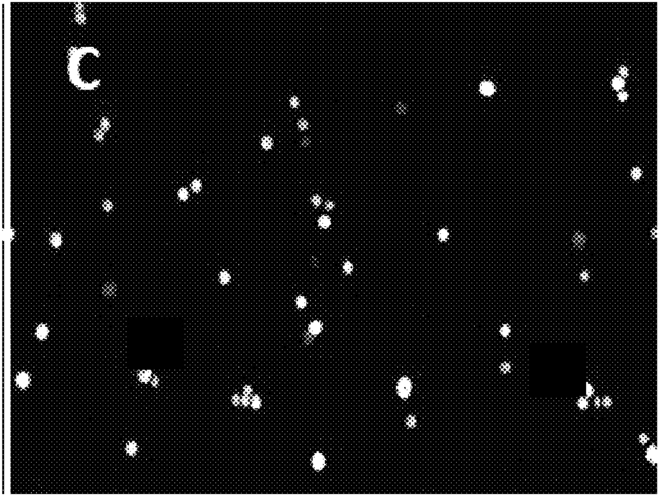

FIGS. 2A, 2B and 2C show 3 images of three different training samples. These are training samples the cells of which have been subjected to cytometry analysis. This analysis makes it possible to determine proportions of living cells and dead cells. A special feature of the training images is that the cells are not individually annotated on the basis of their state (alive or dead). For the cells of one and the same training sample, proportions of cells in the training sample belonging to the same class are available. In this example, this is the percentage of living and dead cells in the same training sample. Each training cell of a training sample is thus annotated on the basis of a quantity or proportion of cells belonging to the same class in the training sample.

The cells in each training sample are not annotated individually on the basis of their dead or living state, but on the basis of a proportion of dead or living cells in the training sample. Thus, within one and the same training sample, the annotations of each cell are preferably identical. Such annotations, based on proportions of cells having the same properties, are more easily accessible by implementing automated measuring means, for example cytometry.

In this example, the images of the sample are acquired in a lensless imaging configuration. The sample is illuminated by a light wave produced by a light source. In the acquired image, each particle appears in the form of a diffraction pattern. Using a holographic reconstruction algorithm, it is possible to form a phase image of the sample. In the phase image, each particle appears in the form of an elementary phase image, reflecting the phase shift of the light wave caused by the particle. Such a phase image may be obtained by implementing known reconstruction algorithms. Some examples of reconstruction algorithms are described in U.S. Pat. No. 10,816,454.

Figure 3A:
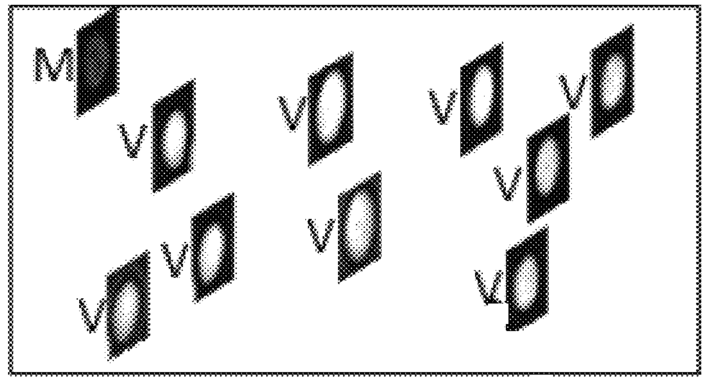
FIGS. 3A, 3B and 3C show images of cells intended for performing learning from labels for a neural network implemented by the device according to the invention.
Figure 3B:
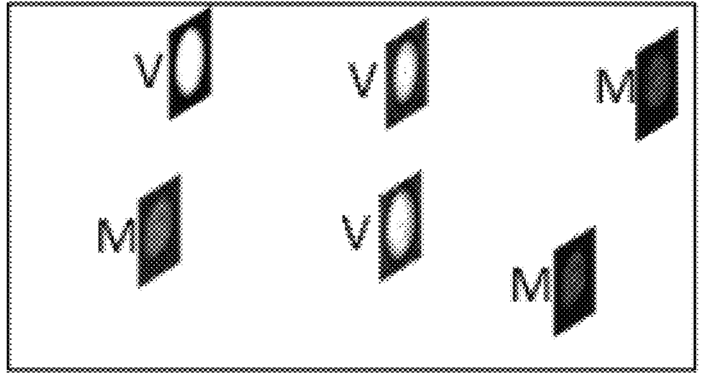
Figure 3C:
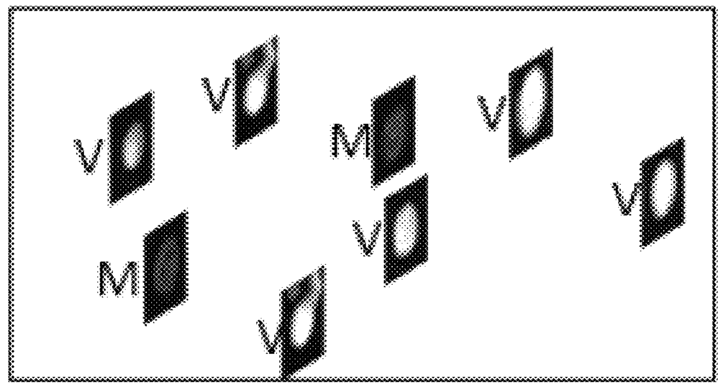

Based on each image, the neural network is trained based on elementary images of each cell, as shown in FIGS. 3A to 3C. The training of the neural network is thus formed, based on each image of a training sample:

- by a proportion of cells in each state in the training sample; in this case, a proportion of living and/or dead cells is indicated, this corresponding to a proportion of labels in the training sample;
- by extracting thumbnails, or elementary images, of each isolated cell, each thumbnail being annotated by the proportion of cells, in each state, in the training sample. Preferably, each thumbnail comprises only a single cell, isolated from the other cells, as shown in FIGS. 3A to 3C.

The use of an algorithm based on learning from label proportions facilitates the training, since this avoids having to individually annotate each cell on the basis of their state, such an operation being lengthy. Proportions of living or dead cells may be obtained globally on various training samples, with a fast and reliable cytometry method.

During use of the neural network on an unknown sample, a score is assigned to each cell, the score being representative of the class to which the cell belongs. In this example, the training images are associated with relative proportions of living cells and dead cells. When processing an unknown image, the algorithm determines a score for each cell, the score corresponding to the class assigned to each cell, in this case the class "living cell" or the class "dead cell".

FIGS. 3A to 3C show images of training samples in which the proportions of living cells are 90%, 50% and 75%, respectively. The figures show thumbnails centred on each cell, be these living or dead. As indicated above, the class of the cells (V for living, M for dead) has been indicated beside each thumbnail. These annotations are not used during training. During training, each thumbnail is annotated on the basis of the proportion of living cells in the training sample.

In the image of the first training sample (FIG. 3A), there are 9 living cells and 1 dead cell, that is to say a proportion of 90% living cells. In the image of the second training sample (FIG. 3B), there are 3 living cells and 3 dead cells, that is to say a proportion of 50% living cells. In the image of the third training sample (FIG. 3C), there are 6 living cells and 2 dead cells, that is to say a proportion of 75% living cells.

In this example, the neural network is trained by minimizing a cost function, based on an L2 norm. Following the training, the neural network assigns, to each living cell, a score corresponding to the average of the proportions of living cells in the training step, in this case (9×0.9+3×0.5+6×0.75)/(9+3+6)=0.78. Similarly, when processing an unknown image, the neural network assigns, to each dead cell, a score corresponding to the average of the proportions of dead cells in the training step, in this case (1×0.1+3×0.5+2×0.25)/(1+3+2)=0.35.

Although described in conjunction with two classes, the principle may be applied generally to a larger number of classes. If i denotes a training image and j denotes a class, the score predicted by the neural network for a cell of class j is equal to $$\frac{\Sigma_i^M N_{i,j} Y_{i,j}}{\Sigma_i^M N_{i,j}},$$

where $N_{i,j}$ is the quantity of cells of class j in an image i;

$Y_{i,j}$ is the proportion of cells of class j in the image i;

$N_{i,j}=N_i Y_{i,j}$, where $N_i$ is the number of cells in the image i;

M is the quantity of training images.

The approach described above was tested taking into account an example of classification of 1-dimensional vectors. FIGS. 4A, 4B and 4C show three different profiles, representative of three classes:

Class 1: Gaussian profile—cf. FIG. 4A.

Class 2: Gaussian profile combined with a gate—cf. FIG. 4B.

Class 3: Gate profile—cf. FIG. 4C.

Approximately 50 000 profiles were generated, each profile belonging to one of the three classes, distributed over 100 training samples. Each training sample contained between 400 and 600 profiles. In each training sample, the relative quantity of each profile, varying between 0% and 80%, was known. On the profiles, the widths of the peaks and the noise around each peak were chosen randomly, so as to obtain a variability in the set of training data.

Following the training, 10 test samples were used, comprising a random quantity of profiles belonging to each class. The 10 test samples contained 4300 profiles. The confusion matrix of the test is shown below: This matrix gives the number of profiles, whose real class corresponds to the column number, detected in a class corresponding to the row number.

$$\begin{bmatrix} 1.7E+3 & 0 & 0 \\ 0 & 1.8E+3 & 0 \\ 3 & 0 & 1.8E+3 \end{bmatrix}$$

The confusion matrix demonstrates the reliability of the classification performed by the algorithm.

The method was implemented on samples comprising CHO cells (hamster ovarian cells), each sample being contained in a fluid chamber with a thickness of 100 μm arranged at a distance d of 1500 μm from a CMOS sensor. The sample was illuminated by a light-emitting diode 11 whose emission spectral band is centred on a wavelength of 450 nm and located at a distance D=1.4 cm from the sample. Such a device is described in U.S. Pat. No. 10,379,027.

48 sample images were available, in which only proportions of living or dead cells were available. FIG. 5 shows the proportion of living cells (y-axis) for each sample (x-axis). The algorithm was trained using 46 images out of the 48 images available. The images numbered 21 and 44 were used to test the algorithm. The algorithm individually annotated the cells in the two test images (images 21 and 44). The individual annotations performed by the algorithm make it possible to return to a viability rate of 94% for image 21 (the actual value being 97%) and 6% for image 41 (exact value 17%).

This example shows that it is possible to implement learning from label proportions based on different image characteristics. In the example described with reference to FIGS. 2A to 2C and 3A to 3C, the characteristic of each cell is a phase image. It is possible to employ other characteristics, for example profiles representative of a property (modulus, phase) of the light wave illuminating the sample, the profiles being formed at various distances from the sample. The formation of such profiles is described in U.S. Pat. No. 10,379,027 or 10,481,076 or in U.S. Pat. No. 10,845,286. This involves illuminating a sample with a light wave and acquiring an image of the sample using a defocused imaging technique (cf. FIG. 1B) or lensless imaging technique (cf. FIG. 1A). The acquired image comprises diffraction patterns of particles of the sample. A holographic reconstruction algorithm is then applied to the acquired image, so as to obtain, for at least one particle, a profile of an optical property of the light wave illuminating the sample at various distances from the sample, between the sample and the image sensor. The profile is established along an axis parallel to the axis along which the sample is illuminated (for example the axis Z in FIGS. 1A and 1B), the axis of the profile passing through the particle under examination.

In the abovementioned documents, it has been shown that this type of profile may be used to characterize a particle. Implementing the holographic reconstruction algorithm, based on the acquired image, makes it possible to obtain a complex expression of the light wave propagating through the sample to the image sensor. The profile is determined based on the complex expression of the light wave along an axis parallel to the axis of propagation of the light and passing through the analysed particle. It may for example be a profile of the phase or the modulus of the complex expression. More generally, it is a profile established based on the complex expression of the light wave at various distances from the sample, along the axis of propagation of the light, in particular between the sample and the image sensor. The profile is established based on the modulus or the phase or the real part or the imaginary part of the complex expression.

During training, the neural network is fed with various particle profiles, these being annotated by the proportion of particles in a given state, in the training sample under consideration (for example a proportion of living or dead particles). During use of the neural network on unknown samples, the input data of the network are one or more profiles established on particles whose state is not known.

FIG. 6 shows the main steps of a method according to the invention.

Step 100: measuring a characteristic of particles of the sample: this may for example involve an image of the sample showing various particles, in which case the characteristic of each particle is the trace, or elementary image, of each particle in the image. It may also involve various profiles of particles forming the sample.

Step 110: using the characteristic of each particle of the sample as input datum for the artificial intelligence algorithm. The algorithm is programmed to classify the particles on the basis of the characteristics introduced as input data.

Step 120: characterizing each particle on the basis of the output of the algorithm.

The algorithm has been trained beforehand on training samples comprising training particles. The training comprises the following steps:

Step 90: determining a characteristic of each training particle: this involves for example an elementary image or a profile of each particle.

Step 91: defining classes of particles. Then, in each training sample, determining a proportion of training particles belonging to the same class.

Step 92: annotating each training particle on the basis of the proportion determined in step 91 in the training sample to which the training particle belongs.

Step 93: for each training particle, using the characteristic resulting from step 90, annotated by the annotation resulting from step 92, as training data for the algorithm.

The invention makes it possible to perform classification of biological particles without requiring annotation of the particles used during training. The classification may be for example:

a determination of the state of a cell, each class corresponding to a predetermined state of the cell;

a determination of a volume or of a dimension of a cell, each class corresponding to at least one value of the volume or of a dimension of each cell;

a determination of a morphological characteristic of each cell, each class corresponding to at least one morphological characteristic of each cell;

a determination of an optical property of each cell, for example the refractive index of a cell, each class corresponding to at least one value of said optical property;

a determination of a type of each cell, each class corresponding to a predetermined cell type.

The invention claimed is:

1. A method for characterizing biological particles of a sample, the characterization assigning a class to each particle, each class being representative of a property of the particle, the method comprising:

a) measuring a characteristic of at least one particle of the sample;

b) processing the characteristic of each particle using an artificial intelligence algorithm;

c) based on the processing, characterizing the particles of the sample, so as to assign a class to each particle;

wherein the artificial intelligence algorithm has been trained beforehand by learning from label proportions, with at least one training sample, comprising training particles, the training comprising:

(i) determining said characteristic of each training particle;

(ii) determining a proportion of training particles belonging to the same class;

(iii) annotating each training particle on the basis of the proportion determined in step (ii);

(iv) using the characteristics of the training particles, determined in (i), respectively annotated based on the annotations resulting from (iii), as training data for the artificial intelligence algorithm;

wherein:

steps (i) to (iii) are carried out for various training samples;

each step (ii) comprises determining a proportion of training particles, belonging to the same class, respectively in each training sample;

the respective annotations of the training particles of one and the same training sample are identical and known, so that the learning from label proportions is a supervised learning.

2. The method of claim 1, wherein the property is chosen from among:

a state of a particle, each class corresponding to a predetermined state of the particle;

a volume or of a dimension of a particle, each class corresponding to at least one value of the volume or of a dimension of each particle;

a morphological characteristic of each particle, each class corresponding to at least one morphological characteristic of each particle;

an optical property of each particle, each class corresponding to at least one value of said optical property;

a type of each particle, each class corresponding to a predetermined particle type.

3. The method of claim 1, wherein the characteristic of each particle is an image of said particle;

in step i), each characteristic is an individual thumbnail image of each particle of each training sample.

4. The method of claim 3, wherein step a) comprises acquiring an image of a set of thumbnail images for respective particles of the each training sample;

in step b), the image acquired in step a) is used as input datum for the artificial intelligence algorithm.

5. The method of claim 2, wherein:

step a) comprises:

illuminating the sample with a light wave and acquiring an image of the sample using a defocused or lensless imaging technique, the acquired image comprising diffraction patterns of particles of the sample;

applying a holographic reconstruction algorithm to the acquired image of the sample, so as to obtain a phase image of each particle, the phase image being representative of a phase shift, caused by each particle, of the light wave illuminating the sample;

the phase image of each particle forms the characteristic of each particle;

in step b), the phase image obtained in step a) is used as input datum for the artificial intelligence algorithm.

6. The method of claim 5, wherein, in step (i), the characteristic of each particle is a phase image of each particle.

7. The method of claim 1, wherein step a) comprises illuminating the sample with a light wave and acquiring an image of the sample using a defocused or lensless imaging technique, the image comprising diffraction patterns of particles of the sample;

applying a holographic reconstruction algorithm to the acquired image of the sample, so as to obtain, for at least one particle, a profile of an optical property of the light wave illuminating the sample at various distances from the sample;

the profile of the or each particle forms the characteristic of said particle;

in step b), the or each profile obtained in step a) is used as input datum for the artificial intelligence algorithm.

8. The method of claim 1, wherein each particle is a cell or a microorganism.

9. A device for characterizing biological particles of a sample, the characterization being intended to assign a class to each particle, each class being representative of a property of the particle, the device comprising:

a light source, configured to illuminate a sample;

an image sensor, configured to acquire an image of the sample;

a processor, programmed to implement steps b) and c) of a method according to claim 1, the artificial intelligence algorithm implemented by the processor having been trained beforehand by learning from labels, based on training samples, comprising training particles, the training implementing steps (i) to (iv) of the method according to claim 1, wherein:

steps (i) to (iii) are carried out for various training samples;

each step (ii) comprises determining a proportion of training particles, belonging to the same class, respectively in each training sample;

the respective annotations of the training particles of one and the same training sample are identical and known, so that the learning from label proportions is a supervised learning.

* * * * *